(12) United States Patent
Matsui

(10) Patent No.: US 6,460,062 B1
(45) Date of Patent: Oct. 1, 2002

(54) DISCRETE COSINE TRANSFORMATION CIRCUIT

(75) Inventor: Masaru Matsui, Gifu (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/239,348

(22) Filed: Jan. 28, 1999

(30) Foreign Application Priority Data

Jan. 30, 1998 (JP) .......................................... 10-019268

(51) Int. Cl.[7] .............................................. G06F 17/14
(52) U.S. Cl. ..................................................... 708/402
(58) Field of Search ................................ 708/400, 401, 708/402, 403, 404, 490, 523, 520, 521, 603

(56) References Cited

U.S. PATENT DOCUMENTS

| | | | |
|---|---|---|---|
| 4,748,579 A | * 5/1988 | Zibman et al. | ............. 708/405 |
| 4,945,506 A | * 7/1990 | Baji et al. | .................... 708/520 |
| 5,117,381 A | 5/1992 | Juri et al. | |
| 5,471,412 A | * 11/1995 | Shyu | .......................... 708/402 |
| 5,477,469 A | 12/1995 | Motomura | |
| 5,831,881 A | 11/1998 | Friedrich | |
| 5,835,391 A | 11/1998 | Cho | |
| 6,185,595 B1 | 2/2001 | Hori et al. | |
| 6,189,021 B1 | 2/2001 | Shyu | |
| 6,209,015 B1 | 5/2001 | Jhung | |

* cited by examiner

Primary Examiner—Chuong Dinh Ngo
(74) Attorney, Agent, or Firm—Cantor Colburn LLP

(57) ABSTRACT

To simplify the structure of a discrete cosine transformation circuit for use in an audio recording/reproducing device. A selector can desirably supply a value "0" to an input terminal B of the adder/subtracter (80), so that an input to the adder/subtracter (80) via an input terminal A can be passed intact therethrough to be fed back thereto via the input terminal B. With this arrangement, direct connection between a multiplier to the input terminal B is unnecessary, and a selector which conventionally selects the direct connection and a loop back is also unnecessary. Further, since a selector (72) relating to proportional coefficients can desirably supply a value "1" to the multiplier (66), operand data inputted to the multiplier (66) can be supplied intact to the subsequent adder/subtracter (80) through the multiplier (66). That is, a route to the adder/subtracter (89) which does not pass through the multiplier (66) is eliminated, and thus a selector for selecting the routes which pass and does not pass through the multiplier (66) is also eliminated. Further, adjustment of an addition/subtraction order by a calculation order controlling means enables to reduce the subtraction function of the adder/subtracter (80), so that the circuit has a simpler structure.

2 Claims, 3 Drawing Sheets

DISCRETE COSINE TRANSFORMATION CIRCUIT

BACKGROUND OF THE INVENTION

1. Field of the Invention

The present invention relates to a discrete cosine transform circuit which can be used in compression/extension processing of digital voice data in a digital voice recording and reproduction devices, and in particular to simplification of the circuitry structure.

2. Description of the Related Art

FIG. 1 is a block diagram showing a processing device which performs encoding/decoding of digitized voice data. At the time of recording, the entered voice signal is first converted to digital voice data by A/D (analog to digital) converter 2. The digital voice data is divided to three, low, medium, and high, frequency bandwidths using QMF (quadrature mirror filter) circuit 4. The digital time series voice data is converted to frequency component data using DCT (discrete cosine transform) circuit 6, and further quantized by a quantizing unit 8. The generated or encoded data is supplied to the next-stage processing circuit, and recorded in a predetermined recording medium.

At the time of reproduction, processing reverse to the processing described above is performed. Specifically, an inverse quantizing unit 10, IDCT (inverse discrete cosine transform) circuit 12, IQMF (inverse quadrature mirror filter) circuit 14 and D/A (digital to analog) converter 16 perform the conversion reverse to the conversion performed by the quantizing unit 8, DCT circuit 6, QMF circuit 4 and A/D converter 2. Specifically, a voice signal is reproduced from the recorded encoded data.

Additionally, DCT is useful for encoding/decoding voice signals, and it is widely used. There are various types of DCT. For example, there is one type of DCT for use in a voice recording/reproducing device which is represented by the following relational equation of 2M items of time series voice data y(n) represented by a time index n which is a continuous integer and M items of frequency component data X(k) represented by a wave number index k which is a continuous integer:

$$y(n) = \sum_{k=0}^{M-1} X(k)\cos\left(\frac{\pi(2k+1)(2n+M+1)}{4M}\right) \quad (0 \leq n < 2M) \quad (1)$$

The DCT is slightly modified from a basic DCT and is therefor termed a Modified DCT, and will hereinafter be abbreviated as MDCT. Moreover, the inverse modified DCT is hereinafter abbreviated as IMDCT.

As an algorithm for processing DCT at a high rate, a method is known in which FFT (fast Fourier transform) is used. By the algorithm using FFT, sequence y(n) is obtained from sequence X(k) in the MDCT. Conversely, sequence X(k) is obtained from sequence y(n) in IMDCT.

More specifically, the relational equation (1) of the time series voice data y(n) and the frequency component data X(k) is represented in a format suitable for the calculation of IMDCT. For MDCT, calculation is performed based on equation (6) below.

The calculation algorithm regarding IMDCT based on the equation (1) will be described hereinafter. First, the data before conversion, i.e., sequence X(k) is re-arranged and re-constructed according to the predetermined rule to define a new sequence U(k). Based on U(k), Z(j) represented in the following equation is defined. Additionally, in the equation, i denotes an imaginary number unit, and ψ(j) denotes the predetermined function of j.

$$Z(j)=(U(2j)+iU(2j+1))\cdot\exp(i\psi(j)) \quad (2)$$

Furthermore, z(n) defined by the following equation is obtained from Z(j).

$$z(n) = \sum_j Z(j)\exp(i\psi'(j)) \quad (3)$$

In order to calculate the equation (3) at high speed, FFT is used. As is well known, FFT calculates the above equation (3) by repeating the arithmetic operation represented by the following equation. Additionally, ψ'(j) is the predetermined function of j.

$$Z(j_1)+Z(j_2)\cdot\exp(i\psi'(j)) \quad (4)$$

In IMDCT, u(n) defined in the following equation (5) is obtained from the z(n), and the sequence u(n) is re-arranged and re-constructed to obtain the time series voice data y(n). Additionally, $a_0$ to $a_3$ are proportional coefficients defined for every n.

$$u(n)=a_0\cdot Rez$$

$$(n)+a_1\cdot Rez(M/2-1-$$

$$n)+a_2\cdot Imz(n)+a_3$$

$$\cdot Imz(M/2-1-$$

$$n))u(M-1-n)=$$

$$a_2\cdot Rez(n)-a_3\cdot Rez$$

$$(M/2-n)-a_0\cdot Imz(n)+$$

$$a_1\cdot Imz(M/2-1-n) \quad (5)$$

On the other hand, for MDCT, the following relational equation is used to obtain the frequency component data X(K) from the sequence x(n) based on the time series voice data y(n).

$$X(k) = \frac{2}{M}\sum_{k=0}^{M-1} x_1(n)\cos\left(\frac{\pi(2k+1)(2n+M+1)}{4M}\right) \quad (6)$$

The equations (1) and (6) have substantially the same format except the coefficient 2/M. Therefore, the calculation algorithm of MDCT is expected to be similar to that of the IMDCT described above. In practice, the calculation algorithm of MDCT based on the equation (6) is as follows, and has points common with the IMDCT algorithm.

First, a new sequence x'(n) is defined by the sum (or difference) of the predetermined elements of the data before conversion, i.e., the sequence x(n) as shown in the following equation:

$$x'(n)=x(n_1)+x(n_2) \text{ or } x(n_1)-x(n_2) \quad (7)$$

Based on the x'(n), z(j) is defined in the following equation having the same format as that of the equation (2):

$$z(j)=(x'(2j)+ix'(2j+1))\cdot\exp(i\psi(j)) \quad (8)$$

Furthermore, Z(k) is obtained from the z(j) as defined in the following equation:

The equation (9) has the same format as that of the equation $$Z(k) = \sum_j z(j)\exp(i\psi'(j)) \qquad (9)$$

(3), FFT is also used in the high speed calculation in the same manner as in the equation (3), and the arithmetic operation is performed in the following format:

$$z(j_1)+z(j_2)\cdot\exp(i\psi'(j)) \qquad (10)$$

In MDCT, the frequency component data X(k) is obtained from the Z(k) by the following equation (11):

$X(k)=b_0\cdot ReZ(k)+b_1\cdot ReZ$ $(M/2-1-k)$ $+b_2\cdot ImZ(k)+b_3$ $\cdot ImZ(M/2-1-k)$ $X(M-1k)=b_2\cdot ReZ$ $(k)-b_3\cdot ReZ(M/2-1-$ $k)-b_0\cdot ImZ(k)+b_1$ $\cdot ImZ(M/2-1-k) \qquad (11)$ In the equation, $b_0$ to $b_3$ are proportional coefficients determined for each k. When the proportional coefficient $a_L$ (L=0 to 3) determined for each n is represented as $a_L=a_L$(n) or the proportional coefficient $b_L$(L=0 to 3) is represented as $b_L=b_L(k)$, the following relationship is established between the coefficients:

$$b_L(j)=a_L(j)\times 2/M \qquad (12)$$

FIG. 2 is a block diagram showing a conventional IMDCT circuit 1 in which the aforementioned IMDCT arithmetic operation is realized. The data before conversion, i.e., the frequency component data X(k), is stored in RAM (random access memory) 20. The RAM 20 is also constituted to store the results during the course of the arithmetic operation. For example, the proportional coefficient $a_L$(L=0 to 3) is stored in ROM (read only memory) 22. The value read from RAM 20 and held in a register 26 and the value read from ROM 22 and held in a register 28 are transmitted to a multiplier 24, which multiplies these values to transmit them to either register 30 or 32.

An adder/subtracter 34 has two input terminals A, B, and is able to perform addition, i.e., "A+B", and subtraction, i.e., "A−B" or "B−A".

The inputs A and B are respectively connected to the selectors 36 and 38. The registers 26 and 30 are connected to the input side of the selector 36. Therefore, the selector 36 can selectively supply the data stored in RAM 20 or the data multiplied by the multiplier 24 to one input terminal A of the adder/subtracter 34. On the other hand, registers 42, 44 are connected to the selector 38 via a selector 40, while the register 32 is connected to the input side of the selector 38. Therefore, the selector 38 can selectively supply the value stored in the register 32 (e.g., the value obtained by multiplying the data stored in RAM 20 by the multiplier 24 ) or the output result of the adder/subtracter 34 to the other input terminal B of the adder/subtracter 34. The output of the adder/subtracter 34 can be returned and written to RAM 20 via the register 42.

In the conversion of the time series voice data y(n) and the frequency component data X(k), for the time series voice data y(n), consecutive 2M items of data are regarded as one block, and the data is handled block by block. One generated block of time series voice data is stored in RAM 44. In order to minimize the distortion of voice at boundaries of the blocks, the range of the block is determined in such a manner that the end of the preceding block and the top of the following block are overlapped with each other. In the overlapped area, the data values of these blocks are added to generate the final voice data y(n). To overlap the data, the voice data stored in RAM 44 can be returned to the adder/subtracter 34. Specifically, the value read from RAM 44 is transmitted to a selector 46 placed between the multiplier 24 and the register 32. The selector 46 selects the output of the multiplier 24 or the output of RAM 44 to transmit the selected value to the adder/subtracter 34 via the selector 38.

The aforementioned arithmetic operation in the conventional circuit will next be described. First, by developing the right side of the equation (2), Z(j) is represented in the following equation:

$$Z(j)=(U(2j)\cdot\cos\psi(j)-U(2j+1)\cdot\sin\psi(j))+i(U(2j+1)\cdot\cos\psi(j)-U(2j)\cdot\sin\psi(j)) \qquad (13)$$

Therefore, when the data U(k) is stored in RAM 20, and $\sin\psi(j)$, $\cos\psi(j)$ are stored in ROM 22, the real-number and imaginary-number portions of Z(j) are calculated by successively using the multiplier 24 and the adder/subtracter 34. The operation results of the real-number and imaginary-number portions outputted from the adder/subtracter 34 are stored in RAM 20.

As described above, z(n) is obtained by repeating the arithmetic operation shown in the equation (4). When Z(j) stored in RAM 20 is transmitted to the adder/subtracter 34 via the register 26 and the selector 36 without passing through the multiplier 24, the first term on the right side of the equation (4) is supplied to one terminal A of the adder/subtracter 34. Moreover, the second term on the right side is generated by reading Z(j) stored in RAM 20 and $\exp(i\psi'(j))$ stored in ROM 22 and multiplying them in the multiplier 24. The multiplied value is supplied to the other terminal B of the adder/subtracter 34 via the selector 46, the register 32 and the selector 38. The adder/subtracter 34 adds the first and second terms of the equation (4), and the result is stored in RAM 20. The calculation of z(n) is also a complex arithmetic operation, and the real-number portion and the imaginary-number portion are separately calculated in the circuit.

By the arithmetic operation described above, Rez(n), Rez(M/2−1−n), Imz(n), Imz(M/2−1−n) for use in the arithmetic operation of the equation (5) are stored in RAM 20. Moreover, the proportional coefficient $a_L$ (L=0 to 3) is stored in ROM 22. The calculation of the equation (5) is performed by sequentially calculating the terms from the first term on the right side by the multiplier 24 and cumulatively adding/subtracting the values by the adder/subtracter 34.

The calculation will be described in more detail. For example, Rez(n) is read from RAM 20 and stored in the register 26. On the other hand, $a_0$ is read from ROM 22 and stored in the register 28. These values are multiplied in the multiplier 24 and stored in the register 32. Subsequently, Rez(M/2−1−n) is read from RAM 20 and stored in the register 26, while $a_1$, is read from ROM 22 and stored in the register 28. It is herein noted that the content of the register 26 is overwritten and changed from Rez(n) stored for the calculation of the first term to Rez(M/2−1−n) for use in the calculation of the second term. The Rez(M/2−1−n) and $a_1$, are multiplied in the multiplier 24 and stored in the register 30. The adder/subtracter 34 calculates .A+B. in accordance with the contents of the registers 32 and 30 and transmits the result to the register 44.

Subsequently, the third term is calculated in the same manner as the first and second terms, and stored in the register 30. The adder/subtracter 34 calculates "A+B" in accordance with the content of the register 30 and the cumulative added value up to the second term supplied from the register 44, and transmits an output to the register 44. The fourth term is calculated in the same manner, and added to the added value up to the third term, then the result is returned to RAM 20. Thereafter, the second equation of the equation (5) is calculated in the same manner as the first equation. In the calculation of the second equation, the second term transmitted to the input terminal A corresponds to the subtraction from the first term supplied to the input terminal B, and the adder/subtracter 34 performs "B–A".

The structure and operation of the conventional IMDCT circuit have been described above. As described above, since the IMDCT arithmetic operation and the MDCT arithmetic operation have common parts, the conventional MDCT circuit structure is substantially the same as that of the IMDCT circuit shown in FIG. 2, and its operation is substantially the same as the aforementioned operation.

That is, a conventional IMDCT circuit such as described above comprises three selectors as main components for multiplication, addition, and subtraction. A typical MDCT circuit also has the same structure. Therefore, there is a problem that the structure of a conventional discrete cosine transformation circuit is complicated, and so is the structure of a timing generation circuit for controlling the circuit. This hinders reduction of the circuitry size. There is another problem that, when the adder/subtracter is constructed to have functions for achieving three types of calculations, namely, "A+B", "A–B", and "B–A", the adder/subtracter has a large size.

SUMMARY OF THE INVENTION

The present invention has been conceived to overcome the above problems and aims to provide a discrete cosine transformation circuit including a timing generating circuit but having a simple circuitry structure. This is achieved by simplifying the structure of the main components for multiplication, addition, and subtraction, of the discrete cosine transformation circuit for executing discrete cosine transformation and inverted transformation.

According to the present invention, there is provided a discrete cosine transfer circuit (claim 1 second half) comprising an addition-subtraction result register for holding an output from the adder/subtracter; and an addition-subtraction result selector for outputting either content of the addition-subtraction result register or a value "0", an output of the multiplier being connected to the first input of the adder/subtracter, an output of the addition-subtraction result selector being connected to the second input of the adder/subtracter, the addition-subtraction result selector outputting the value "0" so that the addition-subtraction result register is loaded with the output of the multiplier in order to supply the output of the multiplier to the second input of the adder/subtracter.

In general, on the output side of an adder/subtracter, a number of registers for holding the arithmetic result are provided along with an addition/subtraction result selector for selecting reading from the registers. According to the present invention, the addition/subtraction result selector is constructed so as to output a value "0" as well as the content of the register connected thereto. An output from the addition/subtraction result selector is connected to the second input of the adder/subtracter, whose first input is connected to an output from the multiplier or the like. When a multiplication result is inputted from the multiplier into the first input of the adder/subtracter and "0" is inputted from the addition/subtraction result selector into the second input, it is possible to pass the multiplication result toward the output side of the adder/subtracter without changing the value thereof. Since the value can be further supplied to the second input of the adder/subtracter, it is not necessary to connect another output of the multiplication to the second input. When connection between the multiplier and the second input of the adder/subtracter is abolished, a selector which is conventionally provided on the second input side of the adder/subtracter for selecting either an output from the multiplier or an output from the addition/subtraction result selector becomes unnecessary.

Further, the above discrete cosine transformation circuit, (claim 2) further comprises a calculation order controlling section for making adjustment such that multiplication of subtraction terms included in the addition/subtraction using terms based on the operand data by the multiplier and addition of multiplication results of the subtraction terms by the adder/subtracter are carried out before calculation using addition terms so that a total value of the subtraction terms is supplied to the adder/subtracter via the second input wherein the adder/subtracter has only addition/subtraction functions of adding inputs via the first input and the second input, and of subtracting an input via the second input from an input via the first a input.

According to the present invention, when calculating, for example, "A–B+C–D–E", the adder/subtracter first adds subtraction terms, namely "B", "D", and "E", and supplies the result "B+D+E" to the adder/subtracter via the second input terminal thereof. Subsequently, any one of the addition terms, e.g., "A", is supplied to the adder/subtracter via the first input terminal so that the input via the second terminal is subtracted from that via the first terminal to thereby obtain "A–B–C–D". Then, remaining addition terms are added up. With this arrangement, it is sufficient for the adder/subtracter to have the functions only of adding inputs via the first and second input terminals and of subtracting an input via the second input terminal from that via the first terminal. In other words, the function of subtracting an input via the first input terminal from that the second input terminal can be eliminated.

According to the present invention, the above discrete cosine transformation circuit, (claim 3) further comprises a proportional coefficient selector for supplying either the proportional coefficient or a value "1" to the first input of the multiplier, wherein the proportional coefficient selector outputs the value "1" when a value of the operand data supplied to the adder/subtracter via the second input is used intact in the addition/subtraction.

According to the present invention, the multiplier receives a proportional coefficient via the first input terminal and an operand data via the second input terminal. On the first input terminal side of the multiplier, a proportional coefficient selector is connected. The proportional coefficient selector can desirably output a value "1", besides proportional coefficients. Here, in discrete cosine transformation, there may be a case in which operand data is multiplied by a proportional coefficient before being supplied to the adder/subtracter and a case in which operand data is supplied intact to the adder/subtracter. According to the present invention, operand data is supplied to the multiplier in either case, and only in the latter case does, the proportional coefficient selector output the value "1" to be multiplied to the operand data so that the operand data is outputted intact to the subsequent adder/subtracter. With this arrangement, the input system to the first input of the adder/subtracter is unified. That is, a selector which is provided in a conventional circuit having different routs for supplying operand data intact to the adder/subtracter and for supplying from the multiplier, for switching the routes can be eliminated.

BRIEF DESCRIPTION OF THE DRAWINGS

The above and other objects, features, and advantages of the present invention, will become further apparent from the following description of the preferred embodiment taken in conjunction with the accompanying drawings wherein.

DESCRIPTION OF THE PREFERRED EMBODIMENT

The embodiment of the present invention will next be described with reference to the drawings.

Figure 1:
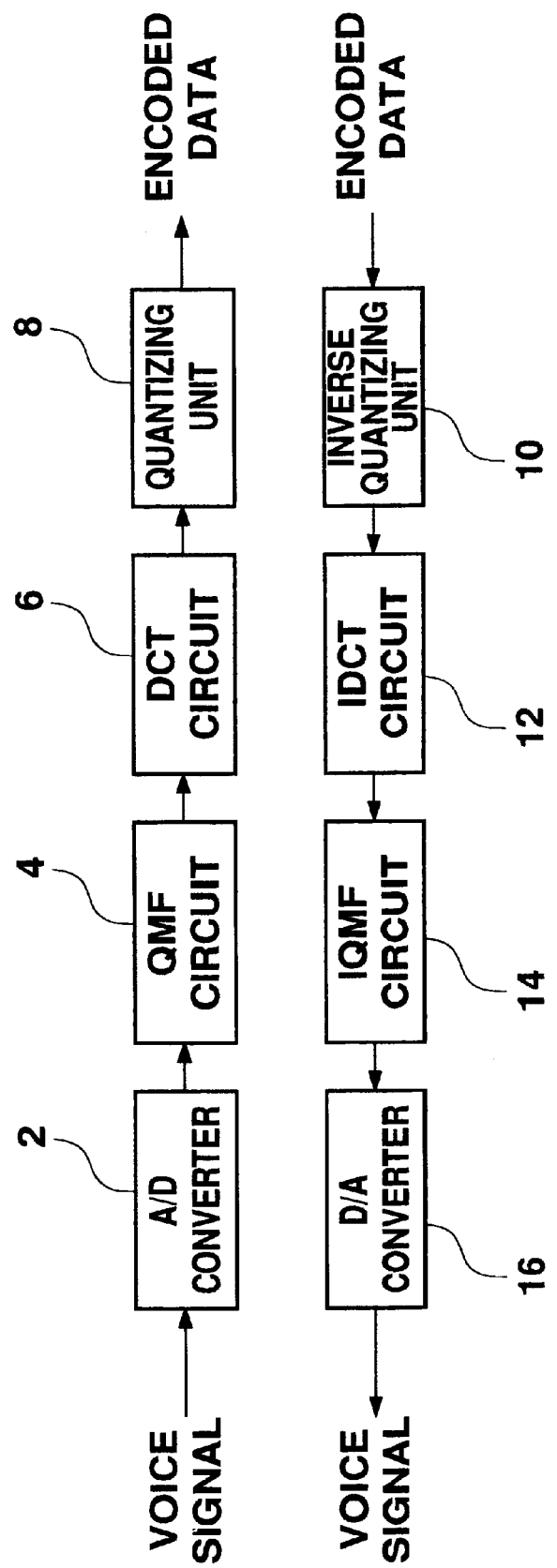
FIG. 1 is a schematic block diagram showing sections for encoding/decoding processing of audio data in an audio recording/reproducing device employing DCT, such as a MD system.
Figure 2:
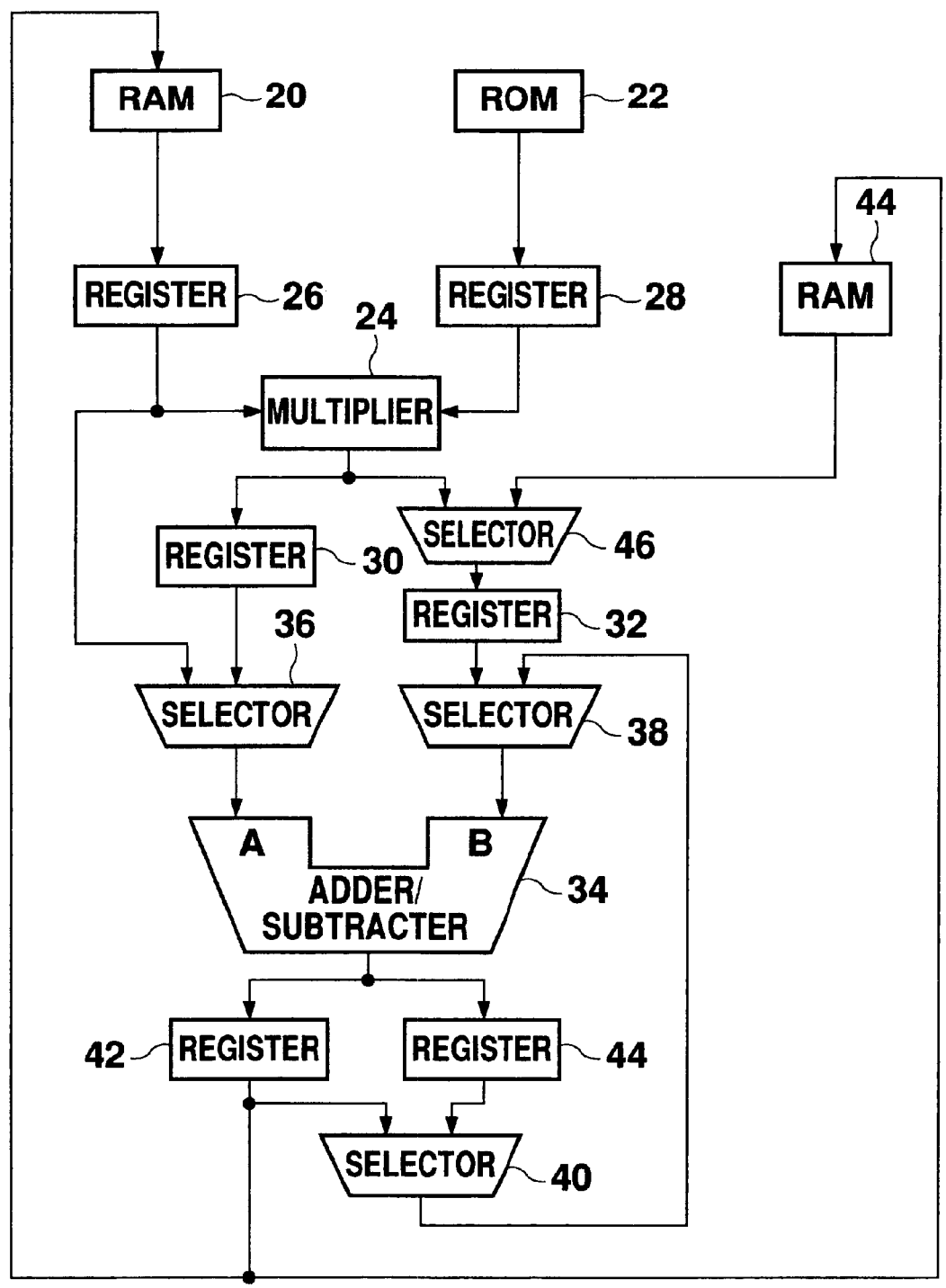
FIG. 2 is a schematic block diagram showing a structure of a conventional IMDCT circuit.
Figure 3:
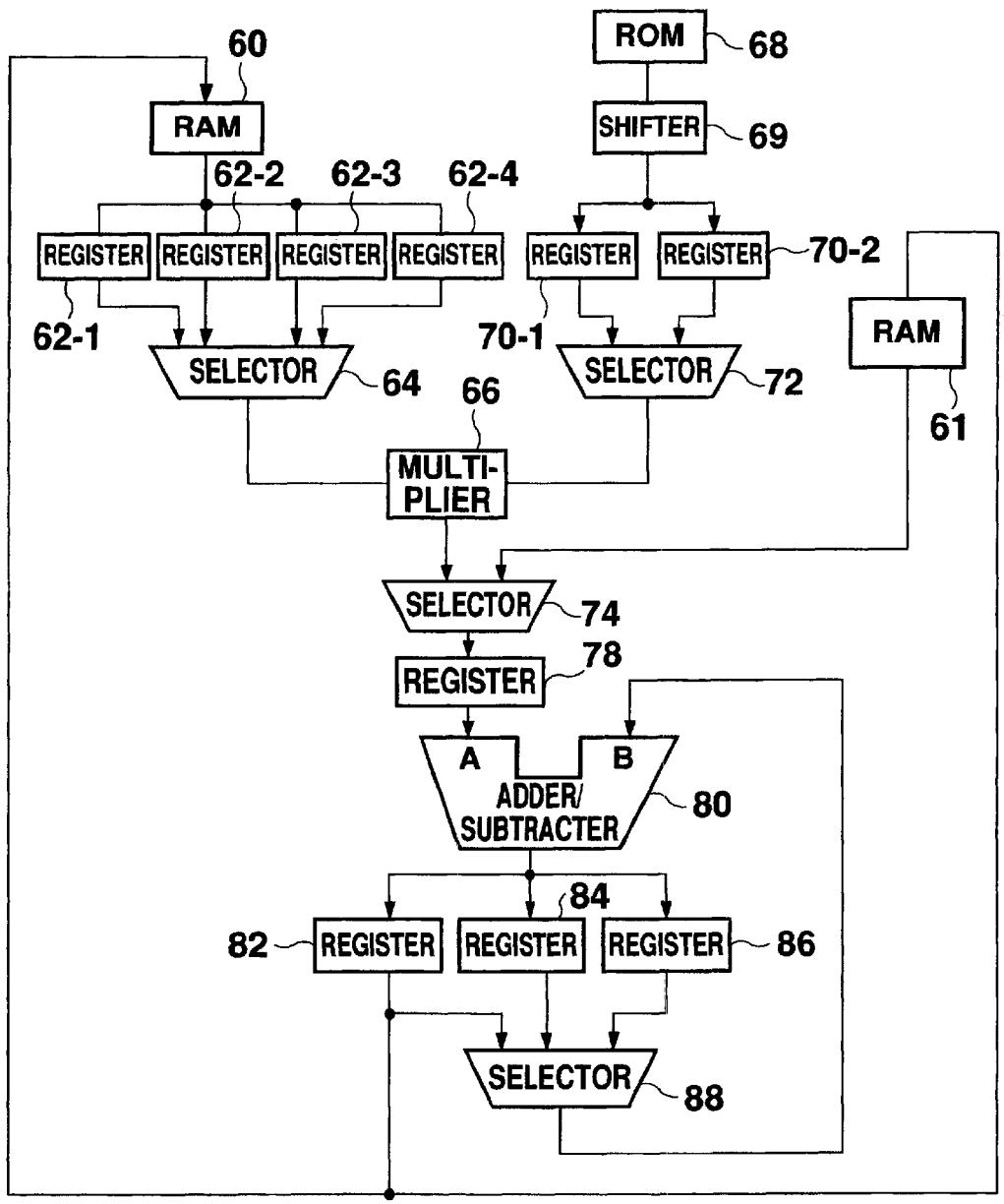
FIG. 3 is a schematic block diagram showing an IMDCT circuit incorporating the present invention in an audio recording/reproducing device using MDCT, such as an MD system.

FIG. 3 is a block diagram of an IMDCT circuit in which the present invention is applied in an MD system or voice recording/reproducing device using MDCT. The voice recording/reproducing device of the embodiment includes a voice data encoding/decoding section having the same block structure as shown in FIG. 1. The circuit is used in the decoding process for reproducing voice from the digital data recorded in MD in the same manner as IDCT circuit 12 of FIG. 1. The frequency component data X(k) for each of high, medium and low frequency bandwidths transmitted from the inverse quantizing unit 10 are IMDCT-processed to generate the time series voice data y(n) for each of the three frequency bandwidths and transmit the data to IQMF circuit 14.

Since the basic arithmetic operation algorithm of IMDCT performed by the circuit is the same as the related-art algorithm described above, the description is simplified by referring to the related art.

The data before conversion or frequency component data X(k) is stored in RAM 60. The RAM 60 can also store the interim results of the arithmetic operation. Four registers 62-1 to 62-4 are arranged in parallel with the output of RAM 60, in which the data read from RAM 60 can be held. A selector 64 selects any one of the registers 62-1 to 62-4, and transmits the content of the selected register to a multiplier 66.

The proportional coefficient by which the data read from RAM 60 is multiplied, e.g., $a_L$(L=0 to 3) is stored in ROM 68. Two registers 70-1, 70-2 are arranged in parallel with the output of ROM 68, in which the coefficients read from ROM 68 can be held. A selector (proportional coefficient selector) 72 selects either one of two connected registers 70-1, 70-2 in the same manner as the selector 64 to output the content of the selected register. The selector 72 is also provided with value "1" as an output to be selected in addition to the contents held in the registers. Specifically, the selector 72 selects any one of the contents held in the registers 70-1, 70-2 and the value "1" under external control from to transmit the selected output to a multiplier 66. The meaning of the value "1" will be described later.

The multiplier 66 receives and multiplies the value transmitted from the selector 64 on the side of RAM 60 and the value transmitted from the selector 72 on the side of ROM 68 to output the multiplied value.

A selector 74 selects the multiplication result transmitted from the multiplier 66 or the value read from RAM 76 to store the selected value in a register 78.

An adder/subtracter 80 has two input terminals A, B, and can perform addition, i.e., "A+B", and subtraction, i.e., "A−B". The operation of this circuit is controlled by a calculation order controlling means, or a timing generation circuit, and the calculation order is controlled so as to avoid subtraction "B−A". Thus, the adder/subtracter 80 may have a simple structure which does not have a function for subtraction "B−A".

An adder/subtracter 80 is connected via one input terminal thereof, e.g., the input terminal A, to the output of the register 78. The output side of the adder/subtracter 80 is connected to three registers 82, 84, 86. The other input terminal B of the adder/subtracter 80 is connected to the output of a selector 88, whose input side is connected to the registers 82, 84, 86.

The selector 88 has a general function of selecting any one of the three connected registers 82, 84, 86 to output the content of the selected register, and is also provided with value "0" as an output to be selected in addition to the contents held in the registers. Specifically, the selector 88 selects any one of the four outputs, i.e., the contents held in the registers 82, 84, 86 and the value "0", under the control from the outside to transmit the selected output to the input terminal B of the adder/subtracter 80. The meaning of the value "0" is described below.

The output of the adder/subtracter 80 can be stored in RAM 60 and RAM 76 via the register 82. In the structure, for example, the data in the course of the arithmetic operation can be accumulated in RAM 60, or the voice data y(n) can be stored in RAM 76 when the voice data is obtained from the frequency component data X(k) for one block.

Additionally, in order to minimize the distortion of voice at each boundary between the blocks, the range of the block is determined in such a manner that the end of the preceding block and the beginning of the following block overlap each other. In the overlapped area, the data values of these blocks are added to generate the final voice data y(n). To overlap the data, the voice data stored in RAM 76 needs to be returned to the adder/subtracter 80. To realize such a structure in the circuit, the selector 74 is placed between the multiplier 66 and the adder/subtracter 80, and connected to the output of RAM 76.

The selector 72 is constituted to output the value "1". In the structure, the input system to the adder/subtracter is unified for both cases where the data read from RAM 60 and multiplied by the proportional coefficient is transmitted to the adder/subtracter 80 and cases where the value of the data is transmitted to the adder/subtracter 80 as it is without multiplying the data by the proportional coefficient, and the selector which has been needed for switching is eliminated to thus simplify the circuit structure. Specifically, the data read from RAM 60 is passed through the multiplier 66. On the other hand, when the value read from RAM 60 needs to be transmitted to the adder/subtracter 80 as it is, "1" is outputted from the selector 72. In this case, the output value of the multiplier 66 is made equal to its input value. Therefore, the need for the selector 36 required in conventional circuits, can be eliminated.

The selector 88 is constituted to output "0". The reason for this structure is related to the structure in which the output of the multiplier 66 is transmitted only to one input terminal A of the adder/subtracter 80 and only the loopback from the output of the adder/subtracter 80 is connected to the other input terminal B. By the structure of the circuit in which no data is transmitted to the input terminal B from the multiplier 66, the selector, which has been necessary for the switching to the loopback from the output of the adder/subtracter 80, is disused to simplify the circuit structure. In the structure, in order to add/subtract the calculated values transmitted to the input terminals of the adder/subtracter 80, the value transmitted to the input terminal A is passed by the adder/subtracter 80 and directed to the input terminal B. Specifically, in order to allow the value transmitted to the input terminal A to pass by, the value "0" is transmitted to the input terminal B of the adder/subtracter 80 from the selector 88. For example, the adder/subtracter 80 adds the data of the input terminal A and the data "0" of the input terminal B, and stores the added result to any one of the registers 82, 84, 86. Thereby, the calculated data transmitted to the input terminal A is passed toward the output side of the adder/subtracter 80, and the value is returned to the input terminal B of the adder/subtracter 80 via the selector 88. The value can therefore be used in the adding/subtracting with the calculated data transmitted to the input terminal A.

It will next be described how the aforementioned IMDCT arithmetic operation be performed in the circuit. First, Z(j) is calculated from U(k) which is obtained by rearranging the data before conversion, i.e., frequency component data X(k) based on the equation (13). The operation is the same as the conventional operation in that the data U(k) is stored in RAM 60 and sin ψ(j), cos ψ(j) are stored in ROM 68. When the right side of the equation (13) regarding a certain j is calculated, U(2j) and U(2j+1) are read from RAM 60, and stored in any two of the registers 62-1 to 62-4, e.g., the registers 62-1 and 62-2. Moreover, cos ψ(j) and sin ψ(j) are read from ROM 68, and stored in the registers 70-1 and 70-2, respectively. Additionally, the real-number and imaginary-number portions of Z(j) are calculated successively using the multiplier 66 and the adder/subtracter 80.

For example, in the calculation of the real-number portion, U(2j+1) stored in the register 62-2 and sin ψ(j) stored in the register 70-2 are multiplied in the multiplier 66 to obtain the second term on the right side of the equation (13) and transmit it to the input terminal A of the adder/subtracter 80. The value of the second term is passed through the adder/subtracter 80, and stored, for example, in the register 86. Subsequently, the first term on the right side of the equation (13) is obtained by multiplying U(2j) stored in the register 62-1 and cos ψ(j) stored in the register 70-1 in the multiplier 66. The value of the first term is transmitted to the input terminal A of the adder/subtracter 80, while the value of the second term is transmitted to the input terminal B from the register 86, so that the adder/subtracter 80 performs subtraction "A−B". Then, the real-number portion of Z(j) is calculated. The output result is stored in RAM 60 via the register 82.

Subsequently, the arithmetic operation is performed using Z(k) to obtain z(n) defined in the equation (3). In the arithmetic operation, the arithmetic operations represented by the equation (4) are repeated. Additionally, the arithmetic operation of one equation (4) in the circuit is performed as follows. Through the arithmetic operation described above, Z(j) is stored in RAM 60, and phase factor exp(iψ'(j)) is pre-stored in ROM 68. The values $Z(j_1)$ and $Z(j_2)$ are read from RAM 60, and stored, for example, in the registers 62-1, 62-2, respectively. On the other hand, exp(iψ'(j)) is read from ROM 68, and stored in the register 70-1. The multiplication of the second term of the equation (4) is performed using the values of the registers 62-2, 70-1, and the result value is passed through the adder/subtracter 80 and supplied to the input terminal B of the adder/subtracter 80. On the other hand, the value of the first term stored in the register 62-1 is passed through the multiplier 66, and supplied to the input terminal A of the adder/subtracter 80. The adder/subtracter 80 performs the addition or the subtraction of these values, and completes the calculation of one equation (4), so that the value is stored in RAM 60. Note that the above calculation for z(n) is a complex operation, in which real-number and imaginary-number portions are calculated separately.

Subsequently, the arithmetic operation for obtaining u(n) defined in the equation (5) is performed using z(n). The value z(n) is stored in RAM 60 by the arithmetic operation described above. Additionally, the proportional coefficient $a_L$(L=0 to 3) is pre-stored in ROM 68. In the calculation of the equation (5) regarding n=$n_1$, Rez($n_1$), Rez(M/2−1−$n_1$), Imz($n_1$), Imz(M/2−1−$n_1$) are read from RAM 60, and stored, for example, in the registers 62-1, 62-2, 62-3, 62-4, respectively. Because these values read and stored in the registers 62-1 to 62-4 can be commonly used for the first and second equations of relational equation (5) for the same "n", they are held in the register while the arithmetic operations of the both equations are carried out.

Calculation for the first equation of equation (5) will be described. Since the respective terms on the right side are addition terms, the timing controlling circuit for controlling the operation of the circuit controls such that, for example, the fourth term on the right side is obtained and the third, second, and first terms are sequentially and cumulatively added thereto. Specifically, proportional coefficients $a_2$ and $a_3$ corresponding to n=$n_1$, are read from the ROM 68, and stored in the registers 70-1 and 70-2. The multiplication of the fourth term on the right side of the first equation of the equation (5) is performed using the values of the registers 62-4, 70-2. The multiplication result value is passed through the adder/subtracter 80, and supplied to the input terminal B of the adder/subtracter 80. Then, the third term of the right side is calculated in the multiplier 66 using the values of the registers 62-3, 70-1, and supplied to the input terminal A of the adder/subtracter 80. The adder/subtracter 80 adds these values, and stores the added value, for example, in the register 86 connected to the output of the adder/subtracter 80. Subsequently, $a_0, a_1$ are read corresponding to n=$n_1$ from ROM 68, and stored in the registers 70-1, 70-2, respectively. The multiplication of the second term of the right side is performed using the values of the registers 62-2, 70-2. The value of the multiplication result and the value held in the register 86 are transferred to the input terminals A, B of the adder/subtracter 80, respectively. The addition result from the adder/subtracter 80 is stored in the register 86. In the same manner, the value of the first term of the right side obtained using the values of the registers 62-1, 70-1 and the addition result of the second to fourth terms held in the register 86 are transferred to the input terminals A, B of the adder/subtracter 80, respectively, and added in the adder/subtracter 80. Thereby, the arithmetic operation of the first equation of the equation (5) is completed, and the arithmetic operation result is stored in RAM 60 via the register 82.

The second equation of equation (5) will be calculated as follows. In this calculation, the timing generation circuit controls involved sections of the main circuit such that the calculation is made in an order determined with consideration of the fact that the right-side second and third terms are subtraction terms. That is, the right-side third term is initially obtained, and then added to the second term so as to obtain the total of the subtraction terms. The total value is supplied to the adder/subtracter 80 via the terminal B to be used in subtraction with the fourth term, which is supplied thereto via the terminal A, i.e., A-B. Finally, the subtraction result is added to the first term. Specifically, proportional coefficients $a_0$ and $a_3$ corresponding to $n=n_1$, are read from the ROM 68, and stored in the registers 70-1, 70-2, respectively. The multiplier 66 multiplies the values read from the registers 62-3 and 70-1 to obtain a value for the third term on the right side member of the second equation of equation (5). The multiplication result is passed intact through the adder/subtracter 80 before being returned to the adder/subtracter 80 via the input terminal B. Subsequently, the multiplier 66 multiplies the values read from the registers 62-2 and 70-2 to obtain a value for the second term on the right side. The result is similarly supplied to the adder/subtracter 80 via the input terminal A. The adder/subtracter 80 adds the received values for the third and second terms, and outputs the result to one of the four registers provided on the output side, for example, the register 86. Then, proportional coefficients $a_1$, and $a_2$, corresponding to $n=n_1$, are read from the ROM 68, and stored in the registers 70-1, 70-2, respectively. The multiplier 66 multiplies the values read from the registers 62-4 and 70-1 to obtain a value for the fourth term on the right side member. The result is supplied to the adder/subtracter 80 via the input terminal A, which also receives a value from the register 86 via the terminal B. The adder/subtracter 80 does subtraction, i.e., A−B, to output the result to the register 86 to be stored therein. Finally, a value for the first term on the right side member, obtained by using the values stored in the registers 62-1 and 70-2, and the calculation result of the second to fourth terms, held in the register 86, are supplied to the adder/subtracter 80 via terminals A and B, respectively, for addition. With the above, the calculation of the second equation of Equation (5) is completed, and the result is supplied through the register 82 to the RAM 60 to be stored therein.

Final digital time series audio data y(n) is obtained through recomposition of the sequence u(n) having been obtained as above.

This IMDCT circuit outputs the result of recomposition to the D/A circuit 16 to complete a series of processing.

The IMDCT calculation of this embodiment, as described above, can be incorporated into an MDCT circuit because MDCT and IMDCT calculations are made using equations of substantially equal formats.

Specifically, since equations (8), (9), and (11) have identical format to respective equations (2), (3), and (5). An MDCT circuit can be made having a substantially identical structure to that of the circuit of this embodiment, in which a selector is eliminated and an adder/subtracter has a fewer functions.

According to a discrete cosine transformation circuit of this invention, a value "0" can be desirably supplied to the adder/subtracter via an input terminal B. With this arrangement, an input to the adder/subtracter via the input terminal A can be fed back intact from the output of the adder/subtracter to the input B thereof through the loopback route. That is, since a direct route from the multiplier to the input terminal B of the adder/subtracter is realized with the loopback, direct connection from the multiplier to the input B can be eliminated. This makes it possible to eliminate a selector for selecting the direct connection and the loopback, achieving simplification of a circuitry structure. Also, a value "0" can be desirably inputted into the multiplier via the input terminal, via which a proportional coefficients are also inputted. With this arrangement, operand data can be supplied intact to the adder/subtracter through the multiplier. Therefore, a separate route to the adder/subtracter which does not pass through the multiplier is unnecessary. As a result, a selector for selecting the routes passing through the multiplier and that which does not is unnecessary, achieving a circuit of a simple structure.

Also, when the order of calculations by the adder/subtracter is adjusted by the calculation order controlling means, the number of functions the adder/subtracter must possess can be reduced. This can simplify the circuitry structure.

With simplification of the circuitry structure, a discrete cosine transformation circuit having a smaller size can be achieved.

What is claimed is:

1. A discrete cosine transformation circuit including a multiplier and an adder/subtracter having a first input and a second input, for performing a discrete cosine transformation from either one of time series audio data and frequency composition data to the other thereof, the multiplier outputting a result to the adder/subtracter, the discrete cosine transformation being performed through multiplication of operand data by a proportional coefficient and addition/subtraction using terms based on the operand data, the operand data being based on data before conversion, which is either the time series audio data or the frequency composition data, the circuit comprising:

an addition-subtraction result register for holding an output from the adder/subtracter;

an addition-subtraction result selector for outputting either content of the addition-subtraction result register or a value "0", an output of the multiplier being connected to the first input of the adder/subtracter, an output of the addition-subtraction result selector being connected to the second input of the adder/subtracter, the addition-subtraction result selector outputting the value "0" so that the addition-subtraction result register is loaded with the output of the multiplier in order to supply the output of the multiplier to the second input of the adder/subtracter; and a proportional coefficient selector for supplying either the proportional coefficient or a value "1" to the first input of the multiplier, wherein the proportional coefficient selector outputs the value "1" when a value of the operand data supplied to the adder/subtracter via the second input is used intact in the addition/subtraction.

2. A discrete cosine transformation circuit according to claim 1, further comprising:

a calculation order controlling section for making adjustment such that multiplication of subtraction terms included in the addition/subtraction using terms based on the operand data by the multiplier and addition of multiplication results of the subtraction terms by the adder/subtracter are carried out before calculation using addition terms so that a total value of the subtraction terms is supplied to the adder/subtracter via the second input, wherein the adder/subtracter has only addition/subtraction functions of adding inputs via the first input and the second input, and of subtracting an input via the second input from an input via the first input.

* * * * *